United States Patent [19]

van der Lely

[11] 4,243,103

[45] Jan. 6, 1981

[54] ROTARY HARROWS

[76] Inventor: Cornelis van der Lely, 7, Brüschenrain, Zug, Switzerland

[21] Appl. No.: 759,669

[22] Filed: Jan. 17, 1977

Related U.S. Application Data

[63] Continuation of Ser. No. 597,680, Jul. 21, 1975, abandoned.

[30] Foreign Application Priority Data

Jul. 22, 1974 [NL] Netherlands ............. 7409854

[51] Int. Cl.³ .................................................. A01B 33/06
[52] U.S. Cl. .................................................. 172/59
[58] Field of Search ............. 172/59, 60, 51, 49, 172/96, 103, 111, 123, 35, 42, 47, 91, 43, 523, 524, 525, 526, 713, 707, 108, 110, 711

[56] References Cited

U.S. PATENT DOCUMENTS

| | | | |
|---|---|---|---|
| 1,830,565 | 11/1931 | Schaeffers | 172/49 |
| 2,438,707 | 3/1948 | Kropp | 172/96 |
| 2,751,833 | 6/1956 | Hupp | 172/42 |
| 2,816,495 | 12/1957 | Brooks | 172/96 X |
| 2,983,322 | 5/1961 | Heeren | 172/59 X |
| 3,460,629 | 8/1969 | Shapland, Jr. et al. | 172/42 |
| 3,616,862 | 11/1971 | Lely | 172/59 X |
| 3,667,551 | 6/1972 | Lely et al. | 172/59 |

FOREIGN PATENT DOCUMENTS

| | | | |
|---|---|---|---|
| 545002 | 6/1956 | Italy | 172/59 |
| 158746 | 11/1963 | U.S.S.R. | 172/59 |

*Primary Examiner*—Paul E. Shapiro
*Attorney, Agent, or Firm*—Mason, Mason and Albright

[57] ABSTRACT

A rotary harrow has a plurality of soil working members mounted in a row and each of the members is rotatably mounted on an upwardly extending shaft. Each soil working member includes a downwardly extending support on the lower end of a corresponding shaft and a soil working tool is mounted on the support. Each tool includes at least one pair of tines having respective coils that encircle the support and the entire tool can be made from a single length of spring steel rod. A transverse bolt with clamps couples the support with a connecting portion of the tool between the coils.

8 Claims, 4 Drawing Figures

ROTARY HARROWS

This is a continuation application Ser. No. 597,680 filed July 21, 1975, now abandoned.

According to the invention, the is provided a soil cultivating implement or rotary harrow of the kind set forth, wherein each fastening portion includes a coil whose longitudinal axis is substantially coincident with the axis of rotation of the corresponding soil working member.

Figure 1:
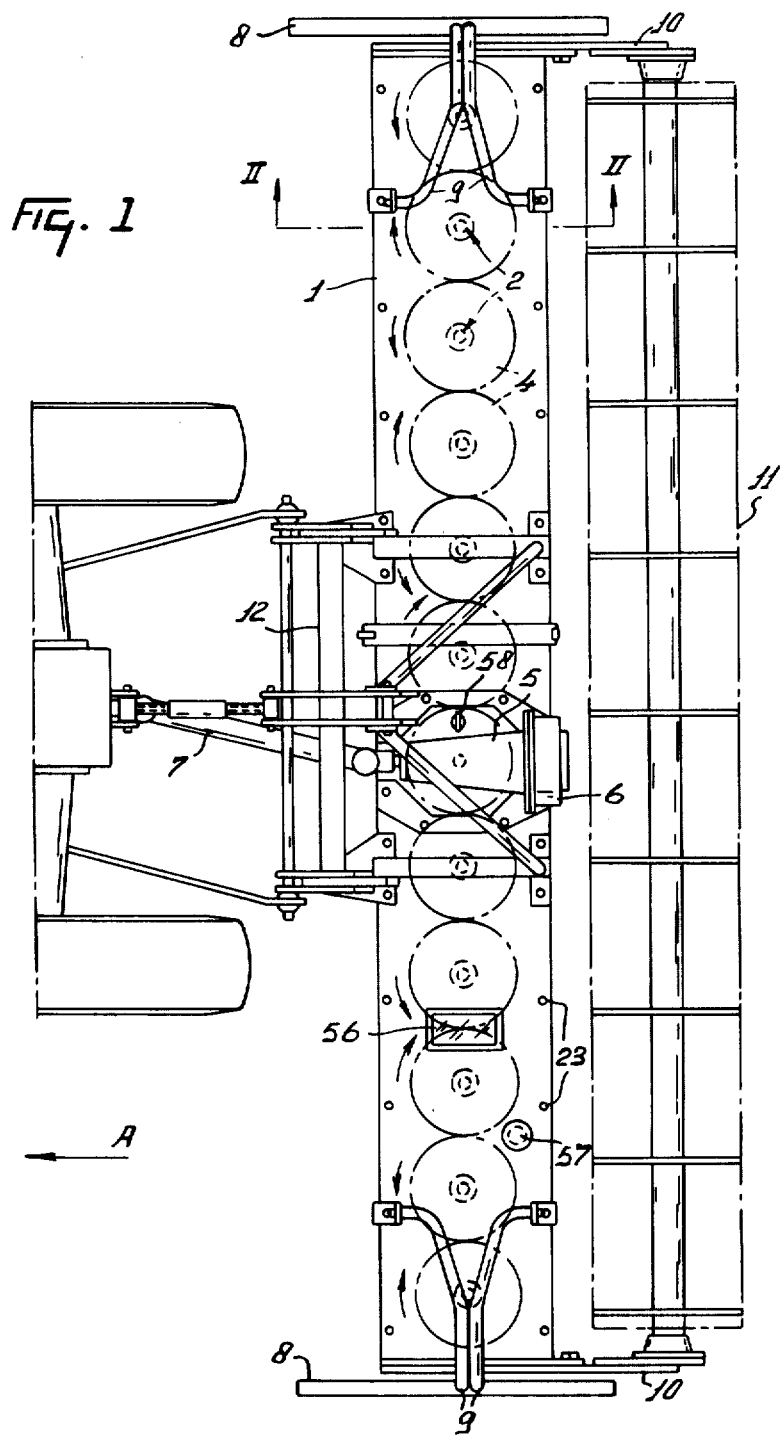
Figure 2:
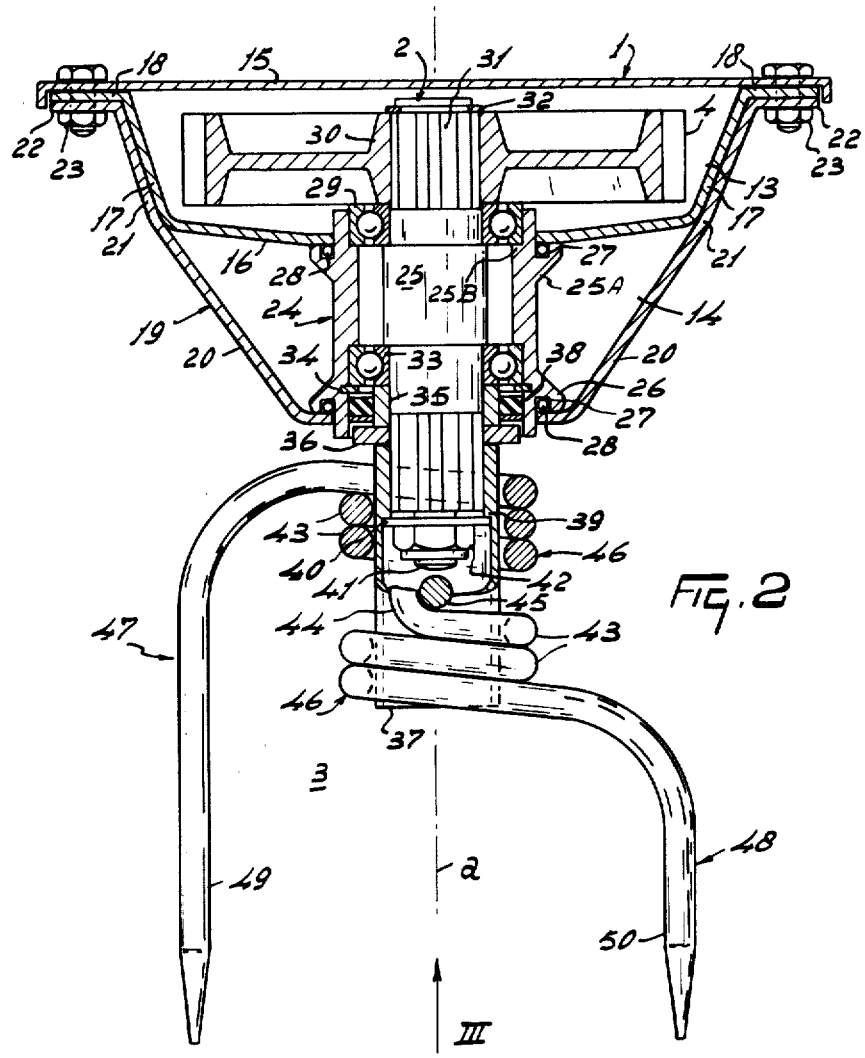
Figure 3:
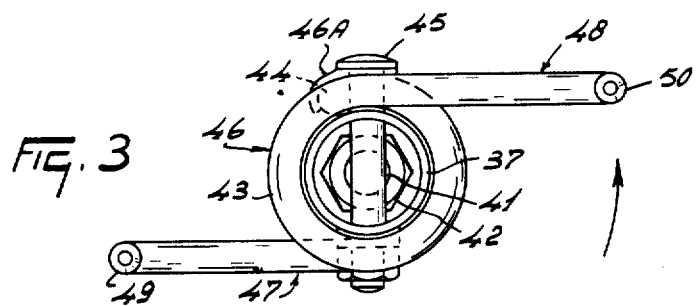
Figure 4:
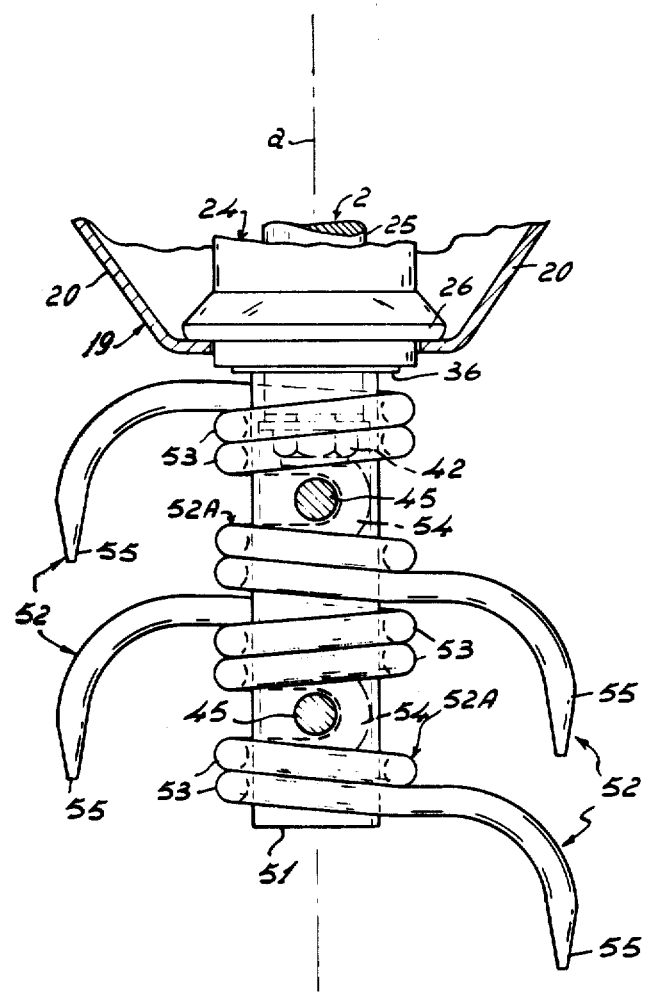

For a better understanding of the invention, and to show how the same may be carried into effect, reference will now be made, by way of example, to the accompanying drawings, in which:

FIG. 1 is a plan view of a soil cultivating implement or rotary harrow in accordance with the invention, FIG. 2 is a partial section, to an enlarged scale, the section being taken on the line II–II in FIG. 1, FIG. 3 is an underneath plan view as seen in the direction indicated by an arrow III in FIG. 2, and FIG. 4 is a part-sectional elevation that is similiar to a lower region of FIG. 2 but that illustrates an alternative embodiment.

Referring to the accompanying drawings, the soil cultivating implements or rotary harrows that are illustrated therein will hereinafter be referred to, throughout the remainder of the descriptive portion of this Specification, merely as rotary harrows for the sake of brevity. The rotary harrow that is illustrated in FIGS. 1 to 3 of the drawings has a hollow bos-shaped frame portion 1 that extends substantially horizontally transverse, and normally substantially horizontally perpendicular, to the intended direction of operative travel of the harrow which is indicated by an arrow A in FIG. 1 of the drawings. A plurality, in this case twelve, of soil working members 3 are rotatably mounted beneath the frame portion 1 at the lower ends of corresponding upright, and normally vertical or substantially vertical, shafts 2. The twelve shafts 2 are arranged in a single row in regularly spaced apart relationship, the distance between the axes of each pair of immediately neighbouring shafts 2 preferably being substantially 25 centimeters but not being greater than substantially 30 centimeters. Each shaft 2 is provided, inside the hollow frame portion 1, with a corresponding straight- or spur-toothed pinion 4, the teeth of each pinion 4 being in mesh with those of its neighbour, or both of its neighbours, in the single row thereof so that all of the soil working members 3 are drivingly interconnected in such a way that each of those members 3 will rotate in the opposite direction to its immediate neighbour, or to both of its immediate neighbours, in the single row as indicated by arrows in FIG. 1 of the drawings. The mounting of the pinions 4 on the shafts 2 will be described in greater detail below.

One of the center pair of the row of twelve shafts 2 has an upward extension into a gear box 5 which is mounted on top of the hollow frame portion 1. The shaft extension is provided, inside the gear box 5, with a bevel pinion whose teeth are in mesh with those of a further bevel pinion carried by a substantially horizontal shaft (not visible) that extends substantially parallel to the direction A. The rearmost end of the substantially horizontal shaft, and the rearmost end of an overlying shaft that is parallel thereto, both project through a rear wall of the gear box 5 and into a change-speed gear 6. The rear ends of the two parallel substantially horizontal shafts that project into the change-speed gear 6 are splined and can receive chosen pairs of co-operating straight- or spur-toothed pinions, those pinions being selected from a number of pairs of interchangeable and/or exchangeable pinions. The particular pair of pinions that is chosen gives a corresponding transmission ratio between the two substantially horizontal shafts and different speeds of rotation of the soil working members 3 can thus be selected by an appropriate choice of pinions without having to alter the input speed of rotation that is applied to the gear box 5. The leading end, with respect to the direction A, of the upper substantially horizontal shaft projects forwardly from the front of the gear box 5 and is there splined or otherwise keyed to enable it to be placed in driven connection with the power take-off shaft of an agricultural tractor or other operating vehicle by using an intermediate telescopic transmission shaft 7 that is of a construction which is known per se having universal joints at its opposite ends. This arrangement is shown in outline in FIG. 1 of the drawings.

Two normally substantially vertically disposed shield plates 8 are arranged immediately beyond the opposite ends of the row of soil working members 3, said shield plates 8 both extending substantially parallel to the direction A. Each shield plate 8 is secured to a corresponding pair of arms 9 and the ends of those arms 9 that are remote from the shield plate 8 concerned are pivotably connected to brackets mounted on top of the hollow frame portion 1, the pivotal connections between said arms and said brackets defining an axis that extends substantially horizontally parallel to the direction A. The lowermost edges of the shield plates 8 are constructed and arranged for sliding motion over the ground surface in substantially the direction A and their pivotal connection to the frame portion 1 by way of the arms 9 enables them to turn upwardly and downwardly about the axes defined by those pivotal connections to match undulations in the surface of the ground that are met with during progress in the direction A. The shield plates 8 minimise ridging of the soil at the opposite edges of the broad strip thereof that is worked by the harrow and substantially prevent stones and other potentially injurious objects from being flung laterally of the path of travel of the harrow by its rapidly rotating soil working members 3 when a cultivating operation is in progress.

The opposite ends of the frame portion 1 are closed by substantially vertical plates that extend substantially parallel to the direction A and arms 10 are turnable upwardly and downwardly alongside those plates about substantially horizontally aligned pivots (not visible) that are located at substantially the tops of the end plates and substantially the fronts thereof with respect to the direction A. Rearmost edge regions of the end plates of the frame portion 1 are formed with arcuately curved slots, or with alternative arcuately curved rows of holes, the centers of curvature of the slots or rows of holes being coincident with the axis that is defined by the strong pivots which connect the arms 10 to the frame portion 1. The arms 10 are formed with single holes that register with the slots, or that can register with chosen ones of the alternative holes, and bolts whose heads can be seen in FIG. 1 of the drawings are entered through the single holes in the arms 10 and through the slots or holes in the end plates, the bolts being capable of being tightened to retain the arms 10 in corresponding angular settings about their pivotal connections to the frame portion 1. A rotatable supporting member in the form of an open ground roller 11 is rotatably mounted between rearmost and lowermost ends of brackets that are carried by the arms 10, said roller 11 extending substantially horizontally parallel to the transverse length of the frame portion 1 and throughout substantially the whole of the strip of land that is displaced by the soil working memnbers 3 during the operation of the harrow. The angular settings of the arms 10 that are chosen relative to the hollow frame portion 1 dictate the level of the axis of rotation of the roller 11 relative to that of the remainder of the harrow and thus control the depth to which tines of the soil working members 3 can penetrate into the soil when the harrow is in operation. A coupling member or trestle 12 of generally triangular configuration is secured to the front of the hollow frame portion 1 with respect to the direction A and is constructed and arranged to enable the harrow to be connected to the threepoint lifting device or hitch of an agricultural tractor or other operating vehicle in the generally known manner which is illustrated in outline in FIG. 1 of the drawings.

It can be seen from FIG. 2 of the drawings that the hollow frame portion 1 comprises an upper chamber 13 and a lower chamber 14 that are located immediately above one another with their longitudinal axes in substantially parallel relationship in a horizontal direction which is normally substantially perpendicular to the direction A. The upper chamber 13 is of basically rectangular cross-section whereas the lower chamber 14 is of basically trapezoidal cross-section. The upper chamber 13 is defined principally by a sheet steel or other sheet metal wall that is in the form of a top plate or cover 15 and by an underlying wall in the form of a similarly constructed central plate 16. The top plate or cover 15 is flat, apart from its leading and rear edges, and is substantially horizontally disposed whereas the underlying central plate 16 has a central substantially horizontal portion which is bounded at both the front and the rear by slightly upwardly inclined portions, the latter portions being bounded, in turn, by symmetrical front and rear upwardly bent over portions 17. Upper edge regions of the two portions 17 are bent over to form coplanar substantially horizontal rims 18. The top plate or cover 15 immediately overlies the rims 18.

The lower chamber 14 is defined principally by the portions of the central plate 16 that lie between its upwardly bent over portions 17 and by a lower sheet steel or other sheet metal wall in the form of a lower plate 19 which, like the overlying central plate 16, has a central substantially horizontally disposed portion. Opposite edges of the substantially horizontally disposed portion are bent over upwardly to form upwardly inclined front and rear flat portions 20 whose upper edges merge, by way of integral angular bends, into more steeply inclined front and rear portions 21 whose internal surfaces abut against the external surfaces of the corresponding portions 17 of the central plate 16. The level of the angular bends which has just been mentioned is the same as the level of the bends which interconnect the slightly upwardly inclined portions of the central plate 16 and the upwardly bent over portions 17 of that plate. The uppermost edges of the front and rear portions 21 of the lower plate 19 are bent over forwardly and rearwardly to form substantially horizontally coplanar rims 22 which immediately underlie the rims 18 of the central plate 16. A gasket which is not shown in the drawings is preferably provided between the rims 18 and the overlying edge regions of the top plate or cover 15. The top plate or cover 15, the rims 18 and the rims 22 are clamped to one another by a plurality of substantially vertically disposed bolts 23 that are arranged at more or less regular intervals around the periphery of the hollow frame portion 1.

The substantially horizontally disposed central portions of the central plate 16 and the lower plate 19 are formed at regular intervals with substantially vertically aligned holes, the distances between the centers of immediately neighbouring holes in each of the plates preferably being substantially 25 centimeters. The aligned holes of each pair receive a corresponding bearing housing 24 which has circular upper and lower ends and that is arranged to co-operate sealingly with the margins of the holes in the two plates 16 and 19. Tightening of the bolts 23 clamps the bearing housings 24 firmly in their appointed operative positions. Each housing 24 has an upper shoulder 25A and a lower shoulder 26 and those shoulders are formed with respectively upwardly and downwardly facing uninterrupted circular grooves 27 in which are lodged corresponding compressible oil sealing rings 28. Each lower shoulder 26 has a substantially square periphery and is arranged so that two parallel edges of that periphery extend parallel, and close, to the bends which integrally interconnect the lower substantially horizontal portion of the plate 19 and its two upwardly inclined flat portions 20. When the bolts 23 are tightened to clamp the assembly together, the bends which have just been mentioned co-operate with the neighbouring parallel edges of each lower shoulder 26 in preventing the corresponding housings 24 from becoming angularly displaced to any significant extent about their own upright longitudinal axes.

Each bearing housing 24 is formed with an internal shoulder 25B that extends throughout a major portion of the axial length of the housing 24 concerned. The upper end of each shoulder 25B co-operates with the external race of a corresponding ball bearing 29, the internal race of the same bearing 29 co-operating with an external plain shoulder 25 of the corresponding shaft 2 which shoulder 25 is of the same length as, and in axial register with, the internal shoulder 25B of the corresponding housing 24. Each bearing 29 projects a short distance above the upper end of the corresponding housing 24 and its internal race abuts against the lower end of a hub 30 of the corresponding toothed pinion 4 in the upper chamber 13. The internally splined hubs 30 of the pinions 4 co-operate with upper externally splined portions 31 of the shafts 2, the hubs 30 being retained against upward axial displacement along the splined portions 31 by circlips 32 whose internal edges are entered in grooves formed in the shafts 2 very close to the extreme upper ends of those shafts. Each shaft 2 is surrounded, beneath the corresponding shoulders 25 and 25B, by a lower ball bearing 33 that is of identical size and construction to the corresponding upper ball bearing 29. The external race of each lower ball bearing 33 is enclosed between the lowermost end of the corresponding shoulder 25B and circlip 34 whose external curved edge is received in a groove formed in the internal surface of the wall of the bearing housing 34 concerned, towards the lowermost end of that bearing housing.

Each shaft 2 is surrounded, beneath the internal race of the corresponding lower ball bearing 33, by a spacing sleeve 35 whose lowermost edge abuts against the upper surface of a corresponding annular ring 36. The lowermost surface of the ring 36 abuts against the uppermost end of a corresponding tubular tine or other tool support 37. An oil sealing ring 38 surrounds each spacing sleeve 35 and has its external surface in contact with the internal surface of the corresponding sleeve 34, said ring 38 being located axially between the corresponding circlip 34 and annular ring 36. Each tubular tine or other tool support 37 is formed, at a distance downwardly from the corresponding ring 36, with an internal shoulder 39 against which bears the upper surface of a corresponding retaining washer 40. The lowermost end of each shaft 2 comprises a corresponding screwthreaded stub shaft 41 and a fastening nut 42 is screwed onto that stub shaft 41 to bear against the lower surface of the corresponding washer 40. The longitudinal axis of each support 37 is coincident with the combined longitudinal axis and axis of rotation a (FIG. 2) of the corresponding shaft 2 and that support is surrounded by upper and lower helical coils 43 whose longitudinal axes are substantially coincident with one another and substantially coincident with the axis a. An upright coupling portion 44 integrally interconnects the lower end of the upper coil 43 and the upper end of the lower coil 43. The coupling portion 44 is firmly but releasably secured to the corresponding tubular support 37 by a transverse bolt 45 that is provided with a clamp 46A. The upper and lower coils 43 form parts of fastening portions 46 of two tines 47 and 48 that have corresponding active or soil working portions 49 and 50 respectively. The active or soil working portions 49 and 50 both extend parallel or substantially parallel to the corresponding axis of rotation a and their upper ends are integrally connected by substantially 90° bends to substantially horizontally disposed parts that integrally connect those bends to the ends of the corresponding coils 43. With this arrangement, and as seen lengthwise of the corresponding axis a (i.e. as seen in FIG. 3), the active or soil working portions 49 and 50 of each pair of tines 47 and 48 are spaced apart from one another by a distance which is not less, and is preferably greater, than the diameter of the corresponding tubular support 37. The active or soil wrking portion 50 of the tine 48 that corresponds to the lower coils 43 has an axial length which is substantially half that of the active or soil working portion 49 of the tine 47 that corresponds to the upper coils 43. The two tines 47 and 48, their fastening portions 46 and the coupling portion 44 are formed integrally from a single length of spring steel rod, the lower extremities of the portions 49 and 50 being tapered to form blunt points.

FIG. 4 of the drawings illustrates an alternate embodiment in which, however, a number of parts are identical to parts that have already been described in connection with FIGS. 1 to 3 of the drawings. Such parts are denoted in FIG. 4 of the drawings by the same references as are employed in FIGS. 1 to 3 thereof. In the embodiment of FIG. 4, the supports 37 are replaced by tubular tine or other tool supports 51 that are of greater axial length than the supports 37. The support 51 that is illustrated in FIG. 4 of the drawings is provided with four tines 52 that are formed as two separate integral pairs, each integral pair comprising a common fastening portion 52A which includes upper helical coils 53 and lower helical coils 53. One again, each integral assembly is formed from a single length of spring steel rod that is preferably of circular or substantially circular cross-section. It will be evident from FIG. 4 of the drawings that one assembly is located axially above the other assembly on the support 51 with the longitudinal axes of the four coils substantially coincident and also substantially coincident with the axis a. In this embodiment, there are two tines 52 at one side of the corresponding axis a and two further tines 52 at the opposite side of that axis. All four of the tines 52 have active or soil working portions 55 that are of substantially the same length, that length being not less than substantially the same as the distance between the two sets of coils 53 of one of the integral pairs of tines 52. As seen in FIG. 4 of the drawings, the lower left-hand tine portion 55 which is part of the upper tine 52 of the lower integral pair is located at a level between that of the two portions 55 that are disposed at the opposite right-hand side of the axis a, those two portions 55 being parts of the lower tines 52 of the upper integral pair and the lower integral pair, respectively.

In the use of the rotary harrow that has been described, its coupling member or trestle 12 is connected to the three-point lifting device or hitch of an agricultural tractor or other operating vehicle in the manner that has been described above and that is illustrated in outline in FIG. 1 of the drawings and the rotary input shaft that projects from the front of the gear box 5 is placed in driven connection with the power take-off shaft of the same tractor or other operating vehicle by way of the intermediate telescopic transmission shaft 7 having universal joints at its opposite ends. The speed of rotation of the soil working members 3 is substantially predetermined by an appropriate choice of pinions in the change-speed gear 6, that choice being made with reference to the initial nature and condition of the soil that is to be cultivated and the degree of fineness of the soil that is desired at the end of the cultivating operation. The depth of penetration of the tines of the soil working members 3 into the ground is also predetermined, having regard to substantially the same factors, by setting the level of the axis of rotation of the roller 11 relative to the level of the frame portion 1 in the manner which has been described above. The distances between the tips of the tines 47 and 48 or 52 that are located at opposite sides of the axes of rotation a are a little greater than are the distances between immediately neighbouring axes a so that, as the harrow is moved over the ground in the direction A with its soil working members 3 rotating in the directions that are indicated by arrows in FIGS 1 and 3 of the drawings, the relatively narrow strips of soil that are worked by the individual members 3 overlap to form a single broad strip of worked soil. Owing to the arrangement of the supports 37 and 51 in axial alignment with the corresponding axes of rotation a, and to the simple construction and mounting of the tine fastening portions 46 and 52A, very satisfactory cultivation of the soil can be effected with inexpensive soil working members 3. The tines simultaneously work overlying layers of the soil and, due to the arrangement of the supports 37 and 51 inside the circles that are traced by the tips of the tines during rotation of the members 3, the harrow can be adjusted so that the tines will penetrate into the earth to a depth at which the supports 37 or 51 are also located at least partly beneath ground level without this interfering with the effectiveness of the cultivation that is produced. Moreover, there is little tendency for weeds, root debris and the like to adhere to the supports 37 and 51. The resilient material from which the tines are made allows them to deflect to an extent sufficient to avoid breakage or significant damage when all but the most stubborn obstacles are encountered in the soil.

The upper chamber 13 of the hollow frame portion 1 is provided with an oil filler cap 57 (FIG. 1) and a transparent inspection window 56 is provided in the top plate or cover 15 of that chamber so that a visual check upon the supply of lubricant in the hollow frame portion 1 can be made. A simple oil level indicator 58 is also provided for ease of checking of the volume of lubricant within the gear box 5.

Although certain features of the two embodiments of the rotary harrow that have been described and/or that are illustrated in the accompanying drawings will be set forth in the following claims as inventive features, it is emphasised that the invention is not necessarily limited to those features and that it includes within its scope each of the parts of each rotary harrow embodiment that has been described, and/or that is illustrated in the accompanying drawings, both individually and in various combinations.

What we claim is:

1. A soil cultivating implement or rotary harrow comprising a frame supporting a plurality of soil working members mounted on substantially vertical shafts and rotatable about said shafts, said shafts being journaled in a portion of said frame and being positioned in a row that extends transverse to the normal direction of travel, supports being connected to the lower ends of said shafts and said supports being located below said frame portion, at least two downwardly extending tines being fastened to each support and said tines having coils that encircle said support, the longitudinal axes of said coils substantially coinciding with the axis of rotation of the corresponding soil working member, lower active portions of said tines being substantially straight and extending substantially parallel to the axis of rotation of said soil working member, said active portions being interconnected to respective coils by intermediate substantially horizontal portions that are integral with said coils and active portions.

2. A harrow as claimed in claim 1, wherein the active portion of the longest tine has a length substantially twice the length of the portion of the shorter tine.

3. A harrow as claimed in claim 1, wherein said support is in substantially axial alignment with said shaft.

4. A harrow as claimed in claim 1, wherein said support is tubular.

5. A harrow as claimed in claim 1, wherein at least part of the length of said support is internally splined and is fitted on cooperating external splines at the lower end of said shaft.

6. A soil cultivating implement or rotaty harrow comprising a frame supporting a plurality of soil working members mounted on substantially vertical shafts and rotatable about said shafts, said shafts being journalled in a portion of said frame and being positioned in a row that extends transverse to the normal direction of travel, supports being connected to the lower ends of said shafts and said supports being located below said frame portion, at least two tines fastened to said support by coils that encircle said support, said tines having respective lower, downwardly extending active portions and intermediate, substantially horizontal parts connected to said coils, the longitudinal axes of said coils substantially coinciding with the axis of rotation of the corresponding soil working member, one tine being connected to said support by an upper coil and the second tine being connected to the support by a lower coil, the lowermost ends of said tines being located at substantially the same soil working levels.

7. A harrow as claimed in claim 6, wherein the length of the active portion of at least one tine is substantially equal to the distance between the two coils.

8. A harrow as claimed in claim 6, wherein the active portions of the tines have different lengths.

* * * * *